United States Patent [19]

Sparks

[11] Patent Number: 5,752,562
[45] Date of Patent: May 19, 1998

[54] PROCESS FOR CASTING MOLTEN METAL

[75] Inventor: Anthony L. Sparks, Columbus, Ind.

[73] Assignee: Reliance Electric Industrial Company, Cleveland, Ohio

[21] Appl. No.: 632,961

[22] Filed: Apr. 16, 1996

Related U.S. Application Data

[62] Division of Ser. No. 243,987, May 17, 1994, Pat. No. 5,531,245.

[51] Int. Cl.$^6$ .................. B22D 23/00; B22D 39/00
[52] U.S. Cl. .................. 164/66.1; 164/133; 164/337
[58] Field of Search .................. 164/133, 66.1, 164/337

[56] References Cited

U.S. PATENT DOCUMENTS

| 2,364,615 | 12/1944 | Beckes | 164/337 |
| 2,408,467 | 10/1946 | Lyons | 164/66.1 |
| 2,707,313 | 5/1955 | McShurley et al. | 164/337 X |
| 2,708,298 | 5/1955 | Beckes | 164/337 |
| 3,497,189 | 2/1970 | Donahue | 164/133 |
| 3,726,305 | 4/1973 | Erickson et al. | |
| 3,815,659 | 6/1974 | Pavlo et al. | 164/133 X |
| 4,110,602 | 8/1978 | McDade | |
| 4,676,295 | 6/1987 | Samuelson | 164/66.1 X |
| 4,715,400 | 12/1987 | Gardner et al. | |
| 5,413,139 | 5/1995 | Kusumoto et al. | |

FOREIGN PATENT DOCUMENTS 1157366  12/1957  France .................. 164/337

OTHER PUBLICATIONS

A prior art flyer identified as "Form VP6" and entitled Electrically Heated Pipes and Valves, published by the Sta–Warm Electric Co., Inc., North Chestnut Street, Ravenna, Ohio 44266.
A prior art bulletin identified as "Bulletin SW–10B" and entitled Controlled Electric Heat, published by the Sta–Warm Electric Co., Inc., North Chestnut Street, Ravenna, Ohio 44266.
A prior art bulletin entitled "D–7: MPS Low–Volume Cast Iron Pump for Zinc Alloy, Lead, and Magnesium."
A bulletin identified as "Product Bulletin 85–5" and entitled Metaullics: Pumping Molten Zinc and Zinc Alloys, published by Metaullics Systems, 31935 Aurora Road, Solon, Ohio 44139, dated May 1985.

Primary Examiner—J. Reed Batten, Jr.
Attorney, Agent, or Firm—Craig N. Killen; John M. Miller; John J. Horn

[57] ABSTRACT

A bath of molten metal is provided, from which a flow is removed. The flow circulates through an unheated conduit to a selected location remote from the bath, and then back to the bath. A depending conduit portion having a heated valve is provided at the selected location. Operation of the valve allows a predetermined amount of the molten metal to be directed into a casting mold.

2 Claims, 2 Drawing Sheets

PROCESS FOR CASTING MOLTEN METAL

This is a division of application Ser. No. 08/243,987, filed May 17, 1994 and now U.S. Pat. No. 5,531,245.

BACKGROUND OF THE INVENTION

The present invention relates generally to a valve which may be used to regulate the flow of molten metal and the like.

In various industrial operations, it is often desirable to transfer molten metal in bulk from a first container to a second container. Such transfer may be effected by a metal pump immersed in a bath of molten metal in the first container. Operation of the metal pump draws the molten metal through an appropriate conduit to the second container. One application in which such bulk transfer techniques are often utilized is ingot formation.

While metal pumping techniques have proven useful in bulk transfer applications, they have generally been unsuccessful in operations requiring a relatively precise amount of molten metal. One such application is the casting of metal articles, such as bearings. For example, bearings are often cast from the class of metals referred to as white metals, or more specifically "babbitt". Babbitt metal is an anti-friction alloy which may include different ratios of lead, antimony and tin depending on the particular article which is to be cast.

The casting of bearings or similar articles from babbitt metal has typically been accomplished utilizing relatively labor intensive techniques. For example, the molten babbitt metal is often removed manually from the bath by a worker using a ladle. The worker then carries the ladle of molten babbitt metal, which may typically weigh 40 pounds or more, to a casting mold.

In the case of a relatively large bearing, three or more such ladles (or even buckets) may be required to complete the casting process. As a result, a worker in this hot environment may quickly become fatigued. Additionally, when more than one ladle is required to cast a bearing, various discontinuities may develop in the structure of the metal.

In an effort to improve the casting process, some gravity feed arrangements have been utilized. For example, in one such arrangement, a bung is inserted into a hole of a bottom of a container in which the molten babbitt metal is maintained. When it is desired that the metal flow into a casting mold, the bung is removed. While this arrangement is somewhat less labor intensive than the ladling technique discussed above, it is difficult to meter relatively precise amounts of the molten white metal into the casting mold.

SUMMARY OF THE INVENTION

The present invention recognizes and addresses the foregoing disadvantages, and others of prior art constructions and methods. Accordingly, it is an object of the present invention to provide improved apparatus for regulating the flow of a fluid such as molten metal.

It is a particular object of the present invention to provide an improved valve for regulating flow of molten metal.

It is a more particular object of the present invention to provide an improved valve for regulating flow of molten metal which is configured to prevent metal freeze when the valve is closed.

It is also an object of the present invention to provide an improved molten metal circulation apparatus to facilitate casting of metal articles.

It is a further object of the present invention to provide an improved process for casting babbitt metal bearings and the like.

Some of these objects are achieved by a valve for regulating flow of a fluid having enhanced flow properties above a predetermined temperature. The valve includes a valve housing defining a fluid inlet and a fluid outlet and further defining a fluid flow path therebetween. A valve seat is fixedly mounted inside of the valve housing along the fluid flow path. A stopper member is located inside of the valve housing and is movable into engagement with the valve seat to close the valve. Movement of the stopper member out of engagement with the valve seat functions to open the valve. Appropriate means, such as a turning handle, are operatively connected to the stopper member for selectively moving the stopper member to vary a flow rate of the fluid.

The valve further includes a heater fixedly secured to the valve housing and inserted to a selected heating location at least partially in the fluid flow path. Operation of this heater functions to maintain the fluid at the selected heating location at a temperature exceeding the predetermined temperature. In an exemplary construction, the valve is configured to regulate flow of a selected molten metal, such as babbitt metal. In this case, the heater is operative to maintain the selected molten metal at a temperature exceeding the melting point temperature thereof. For example, in the case of babbitt metal, the heater element will preferably be operative to heat the selected heating location to a predetermined temperature of at least 500 degrees Fahrenheit.

In an exemplary construction, the heater element includes an elongated cartridge assembly extending to a location inside of the valve housing to be proximate to the stopper member when the valve is closed. Preferably, an end portion of the cartridge will extend into a bore defined in the stopper member when the valve is closed.

The cartridge assembly may be maintained in position by an annular boss integrally mounted on an outer surface of the valve mounting. This boss may have threads on an inner circumferential surface thereof which are complementary to threads on an outer circumferential surface of a base portion of the cartridge assembly.

Other objects of the invention are achieved by a molten metal circulation apparatus for facilitating the casting of metal articles. The molten metal circulation apparatus of the invention includes a metal pump immersible in a bath of molten metal. Operation of the metal pump causes the molten metal to be drawn into a flow conduit in fluid coupling with an outlet of the pump. The flow conduit thus defines a first flow path circulating the molten metal through a selected location remote from the bath of molten metal and back to the bath.

A flow splitter member is connected along the flow conduit at the selected location remote from the bath of molten metal. The flow splitter member has a first outlet along the first flow path and a second outlet to permit diversion a portion of the molten metal along a second flow path. A valve, which is preferably a heated valve as described above, is operatively connected along the second outlet of the flow splitter member to regulate flow of the molten metal along the second flow path.

Preferably, the flow conduit and the valve each have a flow area of at least one inch. A flexible hose may be coupled to an outlet of the valve to permit flow of the molten metal from the valve to be manually directed into a casting mold or the like as desired.

The invention further provides a process for casting babbitt metal into bearings and the like. The process includes the step of providing a bath of molten babbitt metal. A flow of the molten babbitt metal is drawn from the bath to a selected location remote therefrom. At least a portion of the flow is then circulated back to the bath from the selected location. A remaining portion of the molten babbitt metal is directed into a mold by selectively metering the remaining portion from the flow of molten metal through a heated valve located at the selected location.

Other objects, features and aspects of the present invention are discussed in greater detail below.

BRIEF DESCRIPTION OF THE DRAWINGS

A full and enabling disclosure of the present invention, including the best motive thereof, to one of ordinary skill in the art, is set forth more particularly in the remainder of the specification, including reference to the accompanying figures, in which.

Figure 1:
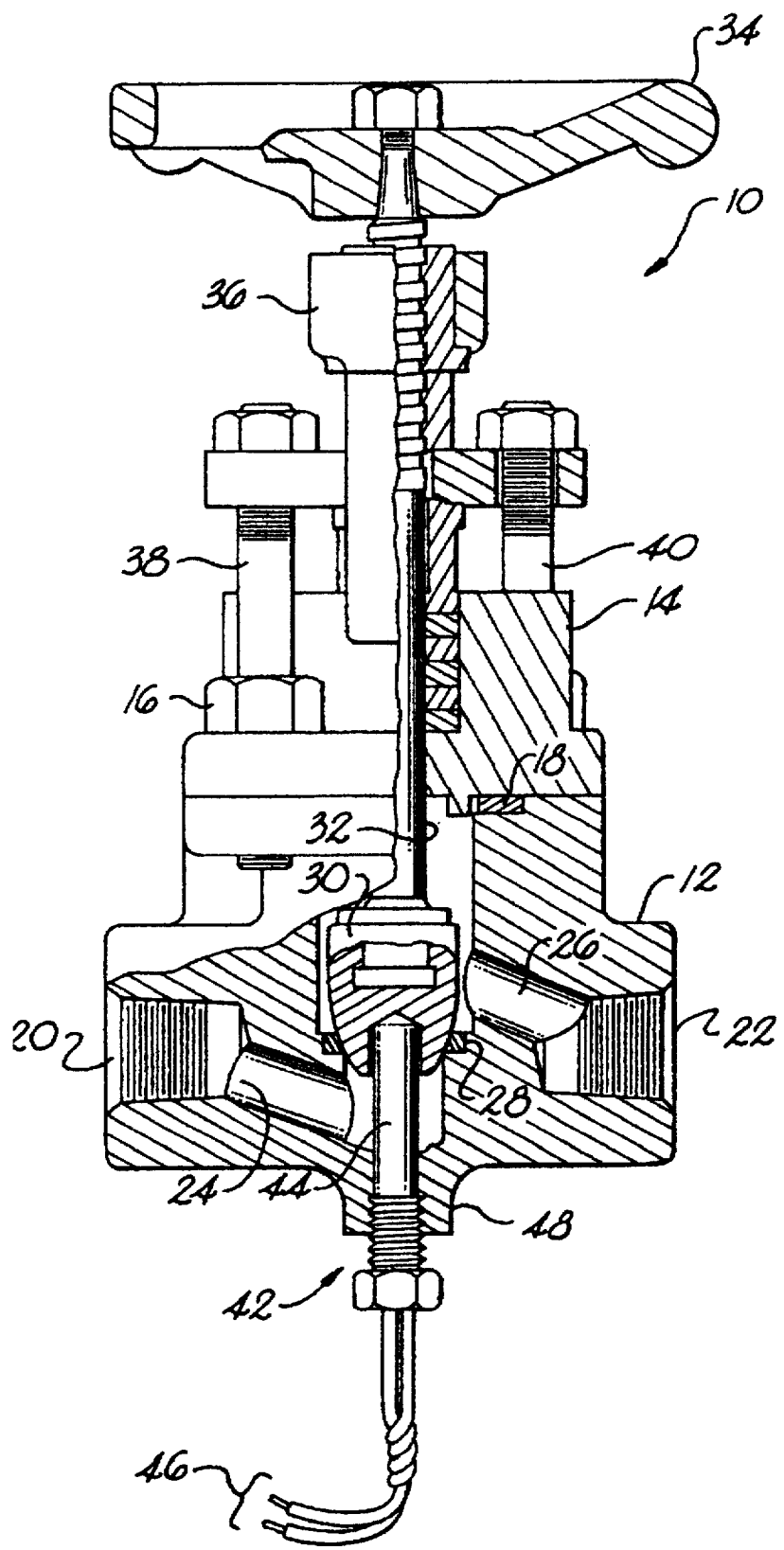
FIG. 1 is a partial cross-sectional view of a heated valve constructed in accordance with the present invention.

Repeat use of reference characters in the present specifications and drawings is intended to represent the same analogous features or elements of the invention.

DETAILED DESCRIPTION OF THE PREFERRED EMBODIMENTS

It is to be understood by one of ordinary skill in the art that the present discussion is a description of exemplary embodiments only and is not intended as limiting the broader aspects of the present invention, which broader aspects are embodied in the exemplary construction.

Referring to FIG. 1, a valve constructed in accordance with the invention is indicated generally at 10. Valve 10 includes a valve housing having a lower portion 12 and an upper portion 14. Portions 12 and 14 are held together in this case by a plurality of bolts, such as bolt 16. Fluid tight relationship between portions 12 and 14 is enhanced by appropriate seals, such as seal 18.

As shown, lower portion 12 of the valve housing defines a fluid inlet 20 and a fluid outlet 22. Inlet 20 and outlet 22 may define appropriate threads about their respective inner circumferential surface to facilitate the coupling of pipe fittings or the like. It should be appreciated, however, that welded fittings or any other appropriate type of fitting may also be utilized.

Lower portion 12 further defines a fluid flow path between inlet 20 and outlet 22 through which the fluid will pass when valve 10 is open. This fluid flow path includes a first passage 24 in fluid communication with fluid inlet 20 and a second passage 26 in fluid communication with fluid outlet 22. An annular valve seat 28 is defined along the fluid flow path between the first passage 24 and the second passage 26.

Valve 10 further includes a stopper member 30 configured to mate with valve seat 28. In this case, stopper member 30 is rotatably connected to one end of a longitudinal valve stem 32. A knob 34 is connected to the other end of stem 32. As shown, stem 32 defines a plurality of rectangular threads in a portion thereof near the end to which knob 34 is attached. Such threads engage complementary threads in a carrier member 36 which is attached to upper portion 14 utilizing bolts, such as bolts 38 and 40.

It can thus be seen that manual rotation of knob 34 will cause reciprocation of valve stem 32. Such reciprocation in turn causes stopper member 30 to be moved into and out of engagement with valve seat 28. When stopper member 30 is moved into engagement with valve seat 28 in this manner, valve 10 will be closed. As stopper member 30 is moved out of engagement with valve seat 28, valve 10 will be opened. As a result, the flow of fluid through valve 10 may be selectively regulated.

Certain types of fluids are known to have enhanced flow properties if maintained above a predetermined temperature. For example, metal being transported through a fluid flow conduit must be maintained above its melting point temperature in order to prevent freezing. Often, this is not an especially difficult task if the flow of the molten metal is sustained at a sufficient flow rate.

The task of maintaining the metal in its molten state becomes more difficult if the flow must be interrupted. For example, assume that valve 10 is being utilized to regulate the flow of molten metal. When valve 10 is closed, molten metal will stagnate in the area in and near first passage 24. In the absence of means to maintain this metal molten, it will generally tend to quickly freeze. If the metal freezes in this location, valve 10 will generally become inoperative.

In order to prevent metal freeze when stopper member 30 is in engagement with valve seat 28, valve 10 includes a heater inserted to a selected heating location at least partially in the fluid flow path. This heater is operative to maintain the fluid at this location at a temperature exceeding a predetermined temperature at which the fluid has enhanced flow properties.

In the case of molten metal, it is desired that the heater element maintain the metal at a temperature exceeding the melting point temperature thereof. This will often be a temperature of at least 500 degrees fahrenheit. Prior art heated valves which have been provided generally heat the housing of the valve externally. Much of this heat, however, will be dissipated by the valve housing itself. As a result, insufficient heat is often transmitted to the interior of the housing to maintain metal in the molten condition.

In presently preferred embodiments, the heater may be a cartridge assembly such as that indicated generally at 42. Cartridge assembly 42 includes an elongated member 44 extending to a location inside of the valve housing to be proximate to stopper member 30 when valve 10 is closed. Elongated member 44 includes a resistive heating element which is powered by electrical supply lines indicated at 46.

Preferably, stopper member 30 defines therein a receiving bore into which an end of elongated member 44 may be inserted. This receiving bore is preferably configured to allow an intimate relation between stopper member 30 and elongated member 44 without actual physical contact therebetween.

Cartridge assembly 42 is maintained in this case by a boss 48 integrally mounted on bottom portion 12 of the valve housing. Specifically, cartridge assembly 42 is maintained by engagement of respective complementary threads defined on an inner circumferential surface of boss 48 and an outer circumferential surface of a base portion of elongated member 44.

Figure 2:
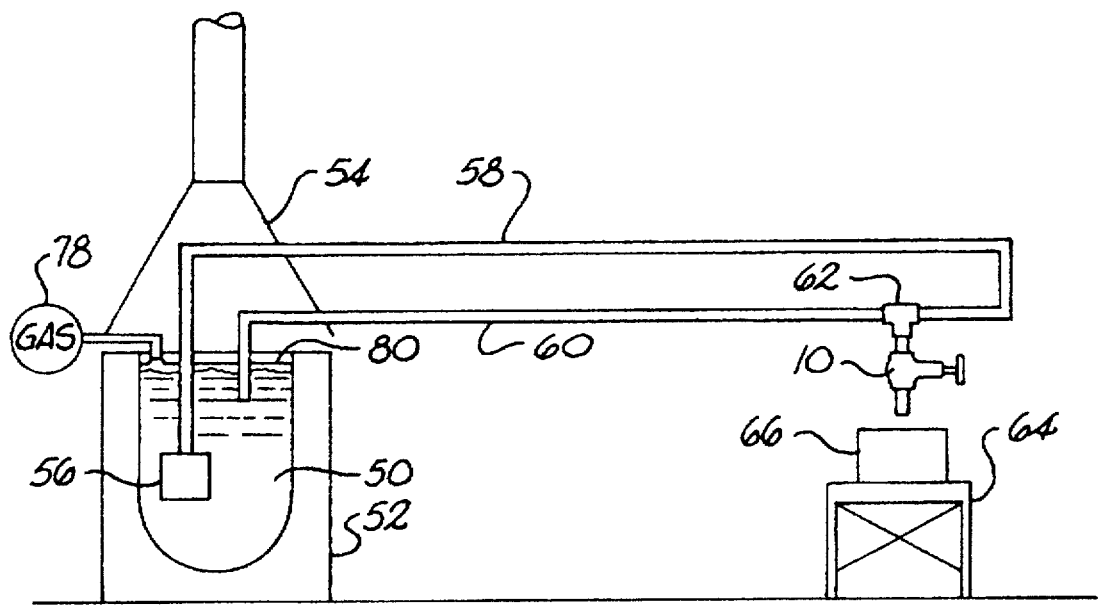
FIG. 2 is a diagrammatic representation of a molten metal circulation apparatus constructed in accordance with the present invention.

As can best be seen in FIG. 2, valve 10 may be incorporated into a molten metal circulation apparatus to facilitate casting of metal articles. In this case, a bath 50 of molten metal is maintained in an appropriate vat 52. An exhausted hood 54 may be situated over vat 52 as shown.

The metal circulation apparatus includes an appropriate metal pump immersed in bath 50, as diagrammatically indicated at 56. One metal pump which is known to be suitable for this purpose is the Model D-7 metal pump manufactured by Metaullics® Systems which has an address of 31935 Aurora Road, Solon, Ohio 44139.

Pump 56 includes a pump inlet into which the molten metal is drawn. Operation of pump 56 passes the molten metal to a pump outlet having an unheated flow conduit in fluid coupling therewith. In this case, the flow conduit includes a first pipe 58 and a second pipe 60 coupled by a flow splitter member 62. This arrangement facilitates a continuous flow of molten, metal from bath 50 and back thereto. Preferably, pipe 60 delivers the molten metal to a level below the surface of bath 50 for reasons that will be explained below.

As shown, flow splitter member 62 is supported at a selected location above a casting table 64, upon which a casting mold 66 is maintained. Valve 10 is also at this location, thus allowing a relatively precise amount of molten metal to be metered into casting mold 66 when desired.

Figure 3:
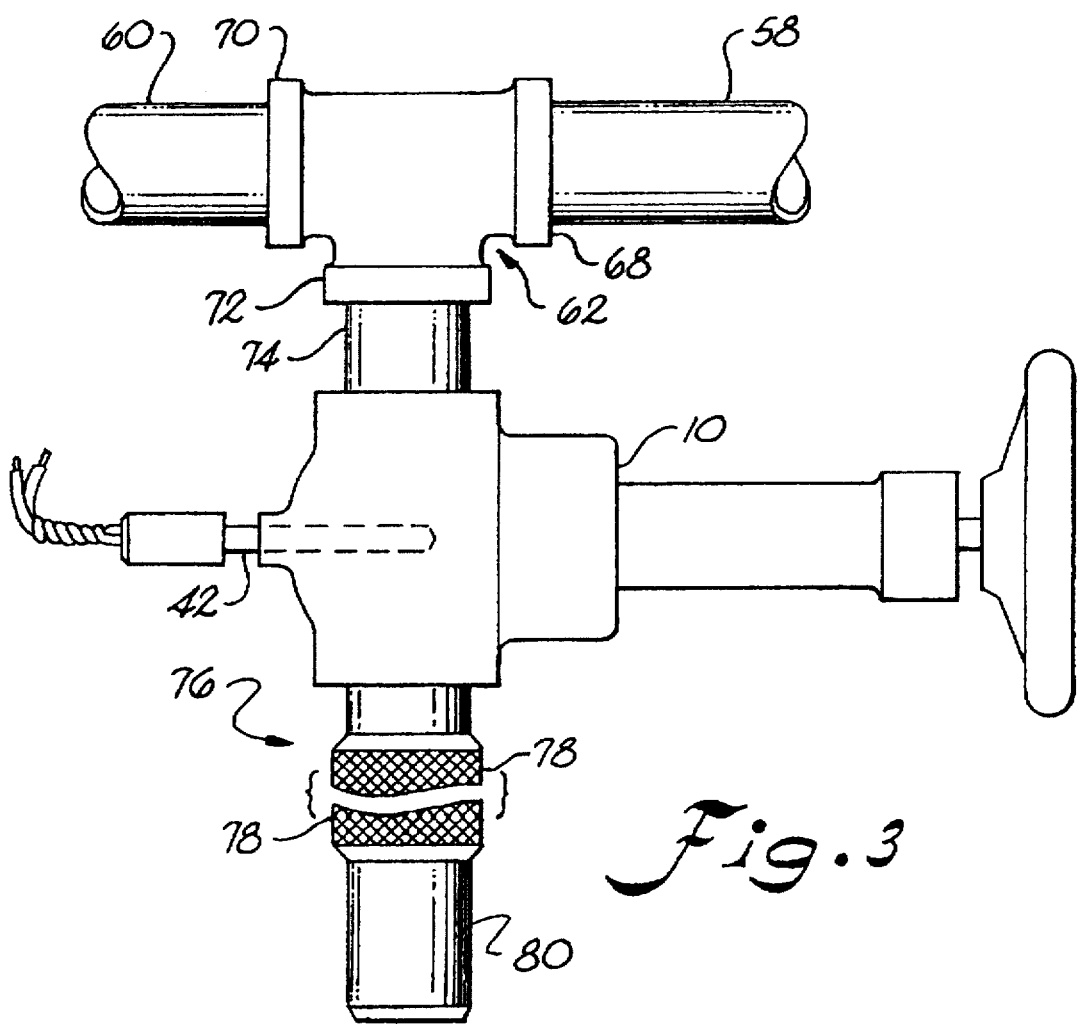
FIG. 3 is an enlarged elevation of the heated valve utilized in the molten metal circulation apparatus of FIG. 2.

The connection of valve 10 into the molten metal circulation apparatus of the invention can be most readily understood with reference to FIG. 3. As shown, flow splitter member 62 defines a fluid inlet 68 and a pair of fluid outlets 70 and 72. Fluid outlet 70 directs flow along second pipe 60. Fluid outlet 72, on the other hand, is operatively connected to an inlet of valve 10 via a short pipe 74.

In presently preferred embodiments, a hose member 76 is connected to the outlet of valve 10. Hose member 76 may have an elongated flexible portion 78 which permits the flow of molten metal from valve 10 to be manually directed. This flexible portion 78 may be 36 inches or more in length. The flow of molten metal then exits a short end portion 80 of hose member 76. It should be appreciated, however, that a rigid pipe may be used in lieu of hose member 76.

The illustrated configuration permits casting of metal articles with babbitt metal or other appropriate types of metal with greater accuracy and often with fewer defects than prior art arrangements. Among the advantages which may be achieved is a substantial reduction in the potential for dross entrapment. Transit time of the metal is reduced, as well as turbulent pours that would often cause porosity and oxide development in the metal article. Additionally, the pumping system continually stirs the bath 50 of molten metal, thus promoting a more homogenous alloy when the bearing is poured.

As noted, the molten metal circulation apparatus of the present invention continually draws molten metal from a location beneath the surface of bath 50 and preferably delivers it back thereto. This configuration ensures that air is, at most, exposed to only the top surface of bath 50. Elimination of air is desirable because it eliminates exposure of the molten metal to oxygen. As is well known, rusty steel is ferrous oxide, which may be expressed chemically as $Fe_2O_3$. Tin and lead, the main elements in babbitt, can also form chemically with oxygen to form $SnO_2$ and $PbO_2$, which are also oxides. Thus, without oxygen, the opportunity for oxides to form is eliminated.

To further reduce the potential for oxide formation, an inert gas system of the type which have been used in prior art casting systems may also be utilized. A system of this type is illustrated in FIG. 3, where an appropriate inert gas source 78 is shown producing a barrier layer 80 of inert gas above the surface of bath 50. An appropriate inert gas for this purpose is argon, although nitrogen is often preferred since it is relatively inexpensive.

While the preferred embodiments have been shown and described, it should be understood that modifications and variations to the present invention may be practiced by those of ordinary skill in the art without departing from the spirit and scope of the present invention, which is more particularly set forth in the appended claims. In addition, is should be understood that aspects of the various embodiments may be interchanged both in whole or in part.

Furthermore, those of ordinary skill in the art will appreciate that the foregoing description is by way of example only, and is not intended to be limitative of the invention so further described in such appended claims.

What is claimed is:

1. A process for casting metal, said process comprising the following steps:

(a) providing a bath of molten metal;

(b) removing a flow of the molten metal from the bath to a selected location remote from the bath via an unheated conduit;

(c) circulating at least a portion of the flow of the molten metal from the selected location back to the bath via the unheated conduit;

(d) providing a depending conduit portion at the selected location having a heated valve associated therewith such that opening of the valve allows molten metal to flow therethrough and closing of the valve causes molten metal to remain in said depending conduit portion; and (e) directing a predetermined amount of the molten metal into a casting mold by selectively metering the predetermined amount of molten metal through the heated valve at the selected location.

2. A process as set forth in claim 1, further comprising the step of:

(f) introducing an inert gas into an area over the bath to exclude air from said area.

* * * * *